United States Patent [19]
Brun et al.

[11] Patent Number: 6,029,517
[45] Date of Patent: Feb. 29, 2000

[54] MINIATURIZED ACCELEROMETER OF THE TYPE USING SPRING COMPENSATION OF THE EFFECT OF GRAVITY AND ITS PRODUCTION PROCESS

[75] Inventors: Jean Brun, Champagnier; Stéphane Caplet, Sassenage, both of France

[73] Assignee: Commissariat a l'Energie Atomique, Paris, France

[21] Appl. No.: 09/088,683

[22] Filed: Jun. 2, 1998

[30] Foreign Application Priority Data

Jun. 17, 1997 [FR] France .................................. 97 07502

[51] Int. Cl.[7] ........................................................ G01P 15/00
[52] U.S. Cl. ............................. 73/514.38; 73/514.32
[58] Field of Search ............................ 73/514.01, 514.32, 73/514.16, 514.38

[56] References Cited

U.S. PATENT DOCUMENTS

| 2,638,578 | 5/1953 | Piety ........................................ 340/17 |
| 5,495,761 | 3/1996 | Diem et al. ........................... 73/514.32 |
| 5,511,421 | 4/1996 | Kudo .................................... 73/514.32 |

FOREIGN PATENT DOCUMENTS

| 0 149 572 | 7/1985 | European Pat. Off. . |
| 0 605 300 | 7/1994 | European Pat. Off. . |
| 2 063 076 | 6/1981 | United Kingdom . |

Primary Examiner—Richard A. Moller
Attorney, Agent, or Firm—Oblon, Spivak, McClelland, Maier & Neustadt, P.C.

[57] ABSTRACT

The invention relates to a miniaturized accelerometer of the type with spring compensation of the gravity effect. The accelerometer seismic mass (1), its support and the compensating spring (2) are produced in the same substrate (10), regulating means being provided for placing the spring under mechanical tension.

18 Claims, 3 Drawing Sheets

MINIATURIZED ACCELEROMETER OF THE TYPE USING SPRING COMPENSATION OF THE EFFECT OF GRAVITY AND ITS PRODUCTION PROCESS

BACKGROUND OF THE INVENTION

The present invention relates to a miniaturized accelerometer of the type using spring compensation of the gravity effect. It also relates to a process for the production of such an accelerometer.

The invention makes it possible to compensate the effects of gravity, to which the object is exposed, consequently improving its sensitivity to an acceleration variation. It more particularly applies to mechanical devices having small dimensions manufactured by microelectronic (e.g. micromachining) methods. The main field of application of said accelerometer is the study of the movement or behaviour of media subject to gravity (e.g. seismology).

An accelerometer or acceleration sensor is constituted by a seismic mass, which is generally supported by one or more flexible elements. When this mass undergoes acceleration variations, it is displaced and the flexible elements are deformed. The system returns to its initial position as soon as the force due to the acceleration is cancelled out. In the inoperative state, a horizontal acceleration sensor is subject to no force or stress. Conversely, a substantially vertically axed accelerometer is subject to a minimum, permanent force F, due to gravity, such that:

F=M.g

M representing the seismic mass and g the gravitational constant.

This permanent force is added to the signal to be measured and requires an increase in the dynamics of the sensor when it is wished to measure very small, vertical accelerations of below $10^{-6}$ g. It is consequently important in this case to compensate the force due to gravity by a constant force directed in the opposite direction.

The processes used for compensating the effect of gravity can be placed in two categories, namely those using an electric power source and those using the return force of a spring.

The processes using an electric power or energy source use an electro-static or electromagnetic force, which maintains the seismic mass in suspension. The systems with electrostatic or electromagnetic compensation of the force of gravity are complex and costly. They consume power and make use of servoloops, which are noise sources and whose stability is difficult to control, particularly in the case of electrostatic forces. Accelerometers produced using microelectronic methods hitherto only make use of electrostatic or electromagnetic compensating systems, despite the disadvantages thereof. This is explained by the fact that hitherto noone has proposed the simple solution of producing a stretched or drawn springs using collective methods.

The gravity force compensating processes using the return force of a spring are generally employed in equipment produced on the basis of conventional mechanical methods, i.e. by machining, followed by the individual assembly of the parts. However, FR-A-2 735 580 has recently proposed an accelerometer, whose seismic mass is maintained in equilibrium by a prestressed spring and which can be produced by methods based on mechanics, micromechanics or microelectronics. The compensating process proposed is based on the principle of a spring in blade or leaf form produced by prestressing a surface of an element (e.g. a beam) supporting the seismic mass.

Finally, mixed systems exist using both an electrostatic or electro-magnetic force and the return force of a spring, as disclosed in the article entitled "The Effects of Spring and Magnetic Distortions on Electromagnetic Geophones" by S J. Chen and K. CHEN, published in J. Phys. E.: Sci. Instrum., 21, 1988, pp 943–947.

The gravity force spring compensating process has the advantage, compared with the process using an electric power source, of not intro-ducing background noise produced by an automatic control system. Moreover, a compensation by spring constitutes a simple, stable, inexpensive and reliable process.

Acceleration sensors having a substantially vertical axis for which the effect of gravity on the mass is compensated by a spring are at present produced by assembling various mechanical parts. Due to this construction procedure, such devices do not have a very high quality factor Q. This structural parameter is linked with the Brown noise density S of the device by the following relation, which shows that S is inversely proportional to Q and M:

$$s = \sqrt{\frac{4k_b T \omega_r}{MQ\left\{(\omega^2 - \omega^2)^2 + \frac{\omega^2 \omega_r^2}{Q^2}\right\}}}$$

with $$Q = \frac{2\pi\omega_r}{M\lambda}$$

$\lambda$: damping factor $\omega$: frequency $\omega_r$: resonant frequency $k_b$: Boltzmann constant $T$: temperature In order to maintain a Brown noise which does not disturb the measurement, existing devices have a significant mass M. Nevertheless, this solution limits the miniaturization of the assembly. The smallest high performance means (able to detect a few nano G under 1 G) consequently weigh several kilograms and occupy a volume of a few dozen $cm^3$.

The miniaturization of a high performance device makes it necessary to reduce the mass M and consequently increase the quality factor. This can be achieved by making the entire sensor (mass and spring) of a material having a high quality factor, such as e.g. monocrystalline silicon. However, the production of a compact device having a spring integral with the mass gives rise to technological problems. Thus, it is difficult to interconnect small mechanical parts, such as the spring and the seismic mass by mechanical means, such as screws or adhesive, without giving rise to areas where internal frictions are high and cause damping phenomena prejudicial to the quality factor. It is also necessary to maintain a considerable flexibility of the spring which, as is demonstrated by the following equations, influences the sensitivity of the sensor:

$$s = \frac{1}{k} \text{ and } S = \frac{M}{K+k}$$

with s: flexibility of the spring k: rigidity of the spring
S: sensitivity
K: rigidity of the device without compensating spring.

BRIEF SUMMARY OF THE INVENTION

The object of the present invention is to propose a miniaturized accelerometer with spring compensation of the gravity force. This accelerometer can be produced by microelectronic production processes giving rise to the following advantages: low cost, miniaturization and good mechanical quality of the materials. This result is achieved by producing the different elements of the accelerometer (support, seismic mass and spring) in the same substrate, which can be a composite substrate.

One object of the present invention consequently is a miniaturized accelerometer comprising:
 a support,
 a seismic mass which can be exposed to a force induced by an acceleration to be measured,
 mechanical connection means between the support and the seismic mass, which can bend under the effect of said force,
 detection means making it possible to determine the acceleration on the basis of the force induced in the seismic mass,
 elastic means for compensating the force exerted on the seismic mass by gravity and linking the seismic mass and the support, characterized in that the support, the seismic mass, the mechanical connecting means and the elastic compensating means are elements produced in a same substrate, regulating means being provided for placing under mechanical tension the elastic compensating means, in order to compensate the force exerted on the seismic mass by gravity.

Advantageously, the elastic means comprise at least one spring having two ends, one of the spring ends being integral with one of the elements, the support or the seismic mass, the other end of the spring being displaceable by regulating means in order to be fixed to the other element, i.e. the support or seismic mass, thereby placing the spring under tension.

The regulating means can be means which make it possible to displace the displaceable end of the spring in a single direction. In this case, they can comprise flexible leaves or blades and retaining abutments or stops arranged in coupled manner on the displaceable end of the spring and on the element, i.e. support or seismic mass, on which the displaceable end of the spring is fixed.

The detection means can be capacitive detection means. In this case, they can comprise teeth fixed to the support in order to form first electrodes and teeth fixed to the seismic mass to form second electrodes, arranged so as to form split-finger transducers.

The substrate can be constituted by a solid quartz or silicon block and can be of the silicon on insulator (SOI) type.

Another object of the present invention consists of a process for producing at least one miniaturized accelerometer in a substrate of a given material, characterized in that it comprises the stages consisting of:
 a) etching the substrate in accordance with its thickness to define:
  a support,
  a seismic mass,
  mechanical connecting means between the support and the seismic mass able to bend under the effect of the force induced by an acceleration to be measured,
  at least one member for constituting a spring, whereof one of the ends is integral with one of the elements, i.e. support or seismic mass, and whose other end is terminated by a head provided with attachment means,
  means for attaching to the other element, i.e. support or seismic mass, complimentary of the attachment means of the spring head,
 b) placing the spring under mechanical tension by attaching the spring head to said other element, i.e. support or seismic mass, until there is a compensation of the force exerted on the seismic mass by gravity.

Yet another object of the present invention consists of a process for producing at least one miniaturized accelerometer in a silicon on insulator substrate, i.e. constituted by a silicon wafer covered by a silicon oxide layer and then a silicon layer, characterized in that it comprises the stages consisting of:
 a) etching the silicon layer until the silicon oxide layer is reached, in order to define:
  a support,
  a seismic mass,
  mechanical connecting means between the support and the seismic mass able to bend under the effect of the force induced by an acceleration to be measured,
  at least one member for constituting a spring, whereof one of the ends is integral with one of the elements, i.e. the support or seismic mass, and whose other end is terminated by a head provided with attachment means,
  attachment means on the other element, i.e. support or seismic mass, complimentary of the attachment means of the spring head,
 b) eliminating the silicon oxide layer below the elements other than the support,
 c) placing the spring under mechanical tension by attaching the spring head to said other element, i.e. support or seismic mass, until the force exerted on the seismic mass by gravity is compensated.

The etching stage can also define teeth fixed to the support in order to form first electrodes and teeth fixed to the seismic mass for forming second electrodes, arranged so as to form split-finger transducers.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

The description will relate to the production of the mechanical part of an accelerometer according to the invention using microelectronic methods making it possible to obtain accelerometers, e.g. of the capacitive detection type and having small dimensions (e.g. 2 cm$^2$ for the largest surface). For further details of these methods, reference can be made to FR-A-2 700 065, which describes a "process for the production of accelerometers using silicon on insulator technology".

Production can be collective. For example, five devices can be produced on a 4 inch (10.16 cm) monocrystalline silicon wafer.

Figure 1:
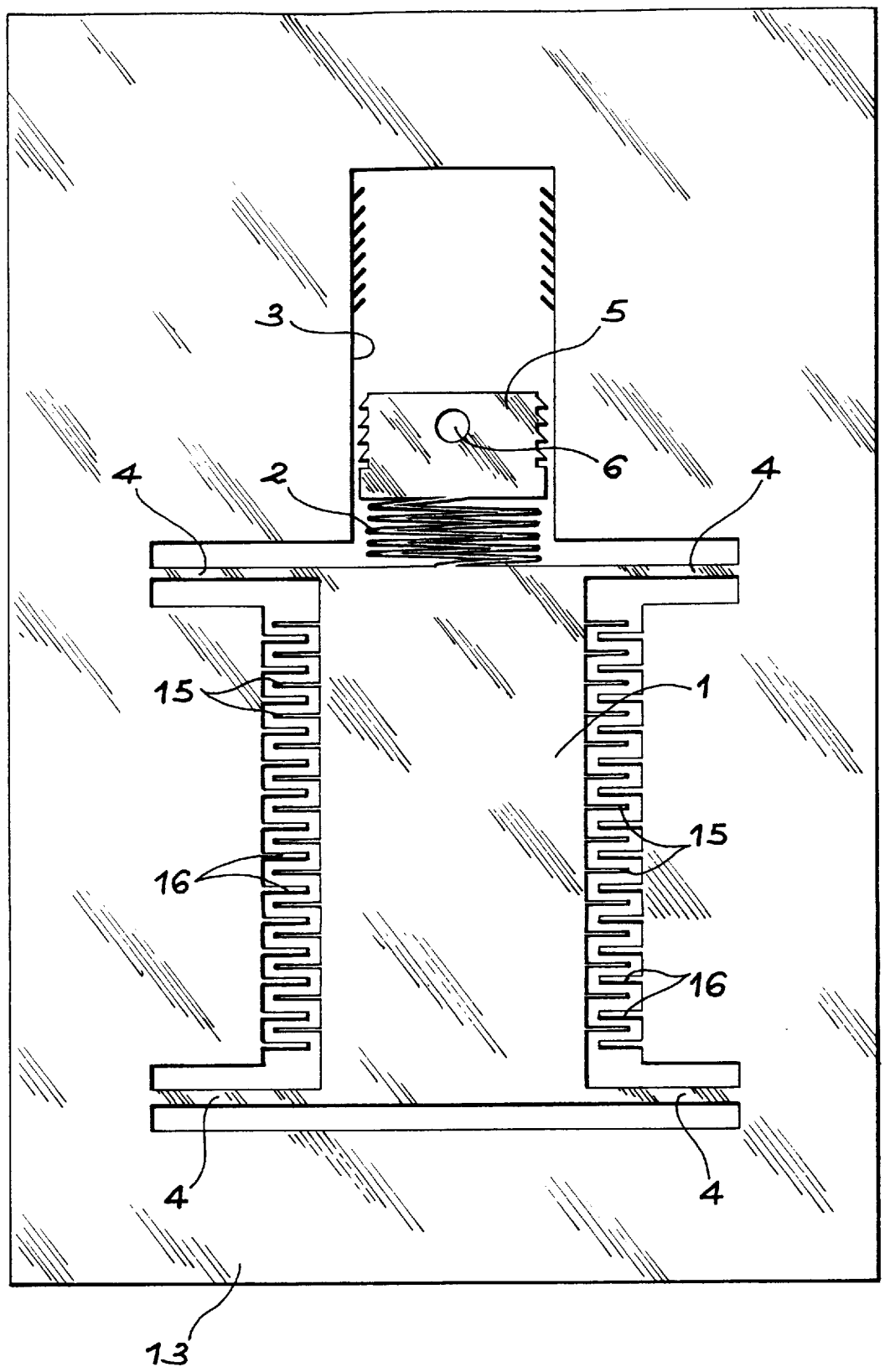
FIG. 1 A plan view of a substrate which has just been etched with a view to obtaining a miniaturized accelerometer according to the present invention.
Figure 2:
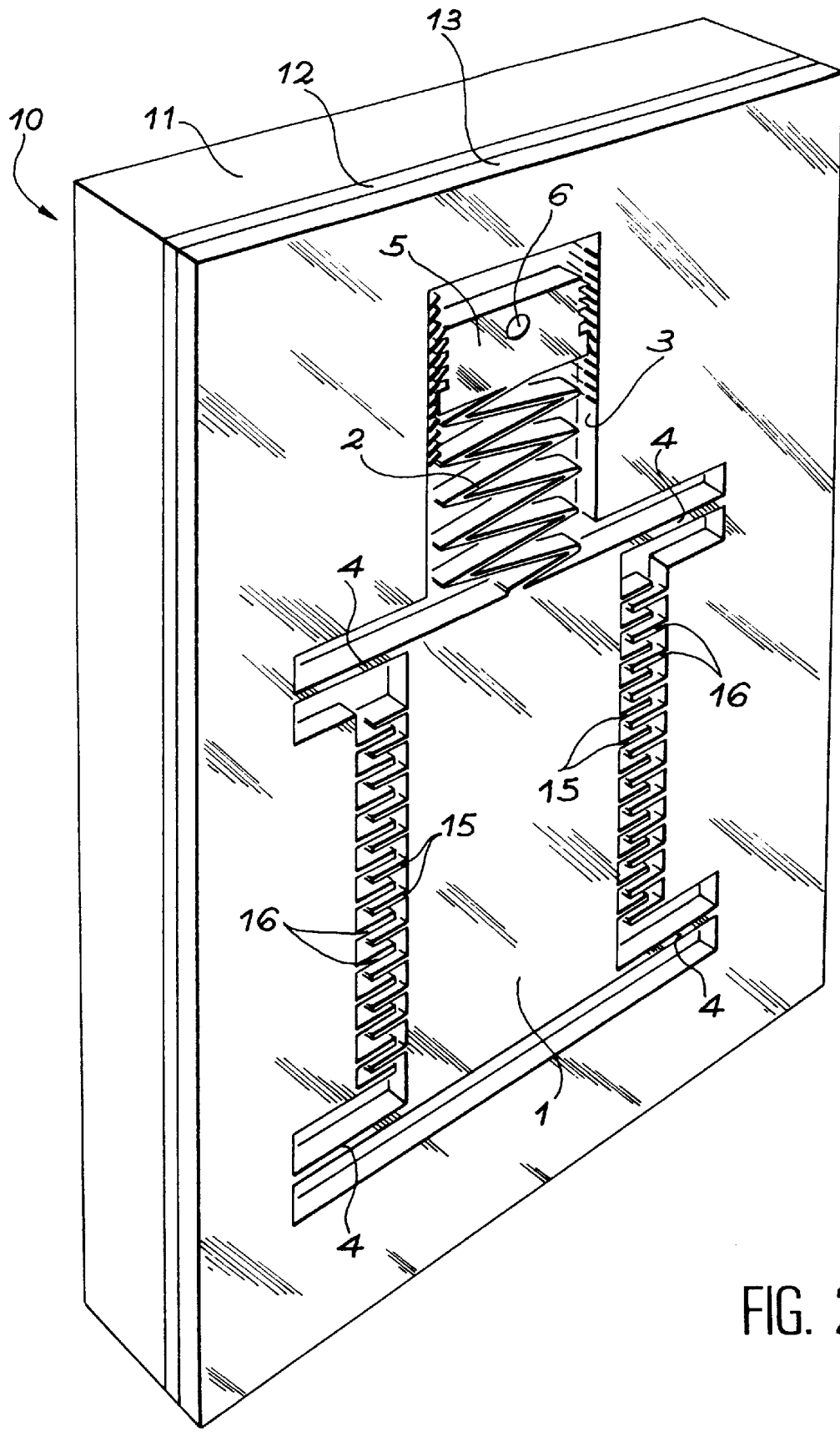
FIG. 2 A perspective view of the mechanical part of an accelerometer according to the present invention, where the effect due to gravity has been compensated.
Figure 3:
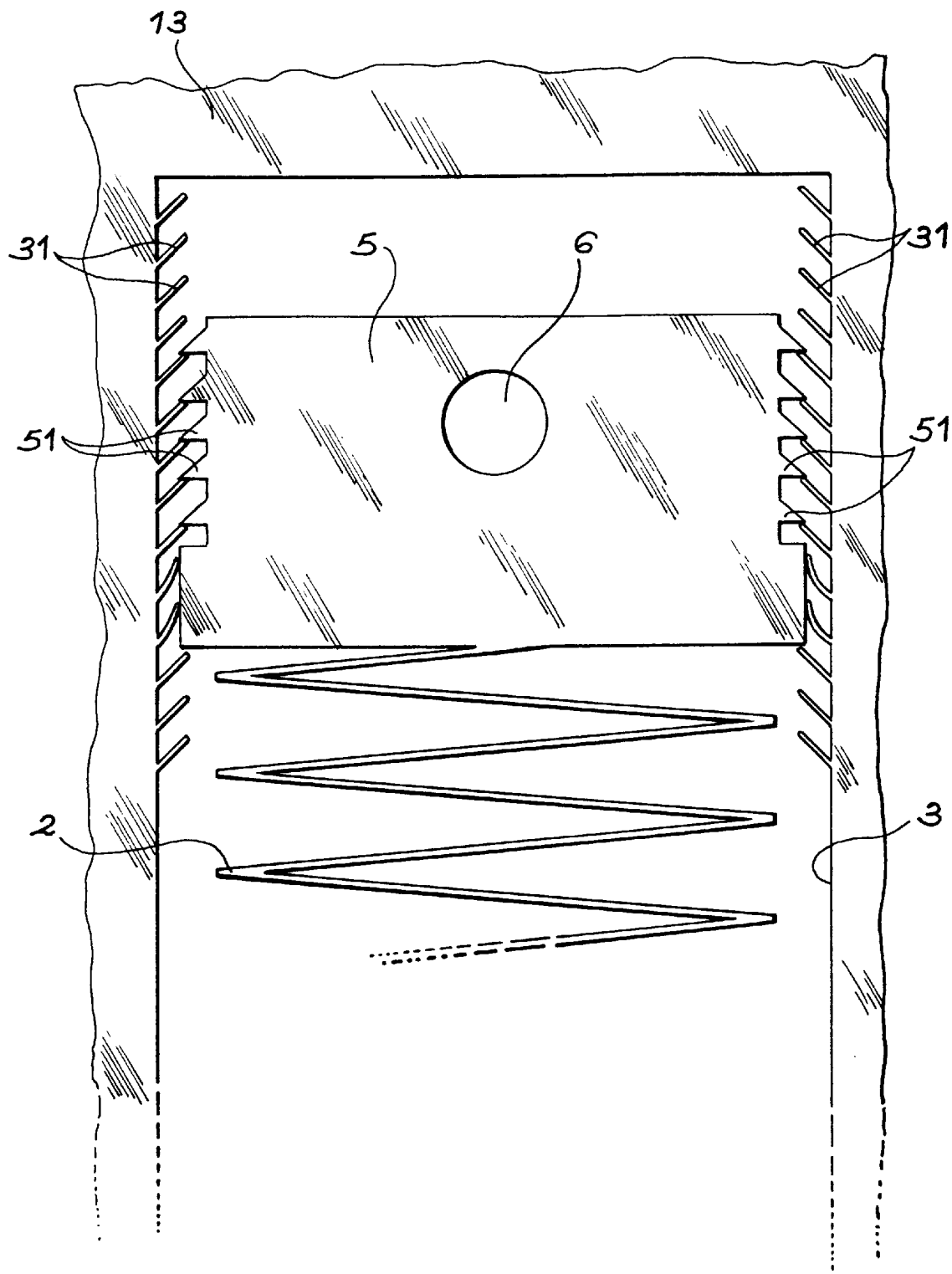
FIG. 3 A detail view of FIG. 2.

The compensating method proposed for the accelerometer illustrated by FIGS. 1 to 3 consists of producing a silicon spring integral with the seismic mass. The spring is pretensioned by displacing the free end of the spring (i.e. the end opposite to that retaining the seismic mass) until the force which it produces balances the weight of the mass which it supports. The mobile end of the spring is then locked in its regulating position, as will be described hereinafter.

The use of a monocrystalline material substrate (silicon, quartz) makes it possible to obtain a high quality factor Q for a low seismic mass M. The use of microtechnology permits miniaturization and collective, i.e. low cost production.

FIGS. 1 to 3 illustrate the production of the mechanical part of an accelerometer from a substrate of the SOI type. This substrate 10 is e.g. constituted by a silicon wafer 11 successively covered with a silicon oxide layer 12 and a monocrystalline silicon layer 13 (cf. FIG. 2). Different known processes make it possible to obtain such substrates. The thickness of the silicon layer 13 can vary from 400 nm to 1 mm as a function of needs or the SOI substrate production procedure. For simplification reasons, the drawings only show a single accelerometer structure.

The free face of the layer 13 is provided with a resin mask by photo-lithography. The layer 13 is then etched by a plasma anisotropic etching process. Such a process is described in the article "A Survey on the Reactive Ion Etching of Silicon in Microtechnology" by H. Jansen et al, published in J. Micromech. Microeng., 6, 1996, pp 14–28. Etching takes place down to the silica layer 12. Then, the silica parts in the recesses made in the layer 13 and beneath the mobile parts of the structure are dissolved in order to disengage the mobile parts from the remainder of the substrate 10.

Etching makes it possible to define a seismic mass 1, a member 2 which will serve as a spring when taut and a recess 3 for the spring 2. The seismic mass 1 is attached to the remainder of the substrate by four beams 4, which are able to bend under the effect of an acceleration to be measured. Etching has left the spring 2 attached to the seismic mass 1. The end of the spring 2 opposite to the seismic mass is extended by a part 5 called the spring head. The spring head 5 is provided with a hole 6 in order to facilitate its manipulation.

The silica has been eliminated on a continuous surface constituted by the recess 3, seismic mass 1, beams 4 and around the seismic mass and beams. The support is then constituted by what is left of the layer 13, the insulating layer 12 and the wafer 11.

Etching has also left flexible leaves or blades 31 attached to the walls of the recess 3 and which are parallel to the axis of the spring 2, as well as retaining stops 51 on the walls of the spring head 5 facing one another. The flexible blades 31 and retaining stops 51 consequently have a depth corresponding to the thickness of the silicon layer 13 (cf. FIG. 3).

For example, the thickness of the silicon layer 13 can be 200 μm, the length of a flexible blade 31 can be 250 μm and its thickness 10 μm. The inclination of the blades can be 45°. The retaining stops 51 can have a triangular section. The overlap of the flexible blades 31 and the retaining stops can be 14 μm.

The accelerometer shown is of the capacitive detection type. For this purpose, etching has left behind teeth able to form electrodes and arranged in such a way as to form split-finger transducers on either side of the seismic mass. The walls of the seismic mass 1, which are perpendicular to the beams 4, support teeth 15, whilst the opposite walls, belonging to the support, support teeth 16. Following metallization of these teeth, series of capacitors are obtained, an elementary capacitor being defined by the space between a tooth 15 and a facing tooth 16.

For compensating the force due to gravity, the spring head 5 is displaced with the aid of a pointed tool introduced into the hole 6 of the head, in the opposite direction to the seismic mass so as to tension the spring. The flexible blades 31, in association with the retaining stops, will ensure both the regulation and the maintaining in position of the spring head 5. Regulation can take place by placing the accelerometer in the vertical position. The spring is stretched until the force exerted compensates the weight of the seismic mass. The check of the displacement of the seismic mass can take place by measuring two differential capacitances level with each split-finger transducer system (when the two capacitances are identical, the seismic mass is in the equilibrium position).

The symmetry and orientation of the flexible blades 31 make it possible to definitively block in one direction the displacement of the spring head and therefore maintain the prestress applied to the spring. The relative displacement of the flexible blades and retaining stops makes it possible to precisely position the spring head relative to the support.

The relative position of the retaining stops 51 and flexible blades 31 can be provided in the manner of a vernier calliper. By providing different spacings for the stops and blades, it is then possible to regulate the position of the spring head with increased precision.

As a first example of a SOI structure, the thickness of the spring can be 200 μm (silicon layer thickness), its width being 1850 μm (corresponding to the width of the recess 3), the thickness of the spring blades can be 10 μm, the number of blades arranged in zig-zag manner can be 200 and the approximate elongation of the spring/weight of the seismic mass can be 25 mm/0.2 g.

As a second example for a SOI structure, the spring thickness can also be 200 μm, its width 5000 μm, the thickness of the spring blades 30 μm, the number of blades arranged in zig-zag manner can be 10 and the approximate elongation of the spring/weight of the seismic mass can be 0.9 mm/0.07 g.

In the case of a solid substrate (monocrystalline silicon or quartz block), etching takes place through the entire substrate thickness.

In this way it is possible to produce seismometers having small overall dimensions, which can be introduced into a bored well.

We claim:

1. Miniaturized accelerometer comprising:

a support, a seismic mass which can be exposed to a force induced by an acceleration to be measured, mechanical connection means between the support and the seismic mass, which can bend under the effect of said force, detection means making it possible to determine the acceleration on the basis of the force induced in the seismic mass, elastic means for compensating the force exerted on the seismic mass by gravity and linking the seismic mass and the support, wherein the support, the seismic mass, the mechanical connecting means and the elastic compensating means are elements produced in a same substrate, regulating means being provided for placing under mechanical tension the elastic compensating means, in order to compensate the force exerted on the seismic mass by gravity.

2. Accelerometer according to claim 1, wherein the elastic means comprise at least one spring having two ends, one of the spring ends being integral with the seismic mass, the other spring end being displaceable by regulating means so as to be fixed on the support, and thus placing the spring under mechanical tension.

3. Accelerometer according to claim 2, wherein the regulating means are able to displace the displaceable end of the spring in a single direction.

4. Accelerometer according to claim 3, wherein the regulating means comprise flexible blades and retaining stops, arranged in coupled manner on the displaceable end of the spring and on the support.

5. Accelerometer according to claim 4, wherein the spacing of the flexible blades differs from that of the retaining stops.

6. Accelerometer according to claim 1, wherein the detection means are capacitive detection means.

7. Accelerometer according to claim 6, wherein the capacitive detection means comprise teeth fixed to the support in order to form first electrodes and teeth fixed to the seismic mass in order to form second electrodes, arranged so as to form split-finger transducers.

8. Accelerometer according to claim 1, wherein the substrate is constituted by a solid quartz or silicon block.

9. Accelerometer according to claim 1, wherein the substrate is of the silicon in insulator type.

10. Miniaturized accelerometer comprising:
 a support,
 a seismic mass which can be exposed to a force induced by an acceleration to be measured,
 a mechanical connector between the support and the seismic mass which can bend under the effect of said force,
 a detector making it possible to determine the acceleration on the basis of the force induced in the seismic mass,
 a spring compensating for the force exerted on the seismic mass by gravity and linking the seismic mass and the support, wherein the support, the seismic mass, the mechanical connector and the spring are elements produced in a same substrate, regulating structure being provided for placing the spring under mechanical tension, in order to compensate the force exerted on the seismic mass by gravity.

11. Accelerometer according to claim 10, wherein the spring has two ends, one of the spring ends being integral with the seismic mass, the other spring end being displaceable by the regulating structure so as to be fixed on the support and thus placing the spring under mechanical tension.

12. Accelerometer according to claim 11, wherein the regulating structure is able to displace the displaceable end of the spring in a single direction.

13. Accelerometer according to claim 12, wherein the regulating structure comprises flexible blades and retaining stops, arranged in coupled manner on the displaceable end of the spring and on the support.

14. Accelerometer according to claim 13, wherein the spacing of the flexible blades differs from that of the retaining stops.

15. Accelerometer according to claim 10, wherein the detector comprises capacitive detection elements.

16. Accelerometer according to claim 15, wherein the capacitive detection elements comprise teeth fixed to the support in order to form first electrodes and teeth fixed to the seismic mass in order to form second electrodes, arranged so as to form split-finger transducers.

17. Accelerometer according to claim 10, wherein the substrate is constituted by a solid quartz or silicon block.

18. Accelerometer according to claim 10, wherein the substrate is of the silicon in insulator type.

* * * * *